United States Patent [19]

Van Gestel

[11] Patent Number: 5,400,187
[45] Date of Patent: Mar. 21, 1995

[54] ARRANGEMENT FOR RECORDING A VIDEO SIGNAL AND A CORRESPONDING AUDIO SIGNAL IN SLANT TRACKS ON A LONGITUDINAL MAGNETIC RECORD CARRIER, AND RECORD CARRIER OBTAINED BY MEANS OF THE ARRANGEMENT

[75] Inventor: Wilhelmus Van Gestel, Eindhoven, Netherlands

[73] Assignee: U.S. Philips Corporation, New York, N.Y.

[21] Appl. No.: 185,638

[22] Filed: Jan. 24, 1994

[30] Foreign Application Priority Data

Jan. 28, 1993 [EP] European Pat. Off. ......... 93200215.7
May 4, 1993 [EP] European Pat. Off. ......... 93201263.6

[51] Int. Cl.⁶ .............................................. G11B 5/09
[52] U.S. Cl. ........................................ 360/48; 360/51
[58] Field of Search ............... 360/13, 14.1, 14.2, 360/19.1, 33.1, 32, 64, 48, 77.8, 77.15; 358/311; 375/19

[56] References Cited

U.S. PATENT DOCUMENTS

| | | | |
|---|---|---|---|
| 4,195,318 | 3/1980 | Price et al. | 360/39 |
| 4,330,799 | 5/1982 | Price | 360/40 |
| 4,598,326 | 7/1986 | Leiner | 375/19 X |
| 5,068,757 | 11/1991 | Hughes et al. | 360/77.13 |
| 5,136,436 | 8/1992 | Kahlman | 360/40 |
| 5,142,421 | 8/1992 | Kahlman et al. | 360/40 |
| 5,191,491 | 3/1993 | Zweighaft | 360/77.15 |
| 5,245,483 | 9/1993 | Van Gestel | 360/40 |
| 5,253,243 | 10/1993 | Suzuki | 369/59 X |
| 5,260,840 | 11/1993 | Hatanaka et al. | 360/48 |
| 5,276,559 | 1/1994 | Sarkisian et al. | 360/33.1 X |

FOREIGN PATENT DOCUMENTS 92203342.8 10/1992 European Pat. Off. ............ 360/48

Primary Examiner—Donald Hajec
Assistant Examiner—Le Thien Minh
Attorney, Agent, or Firm—Edward W. Goodman

[57] ABSTRACT

The format of the signal in a tracking tone recording part (TP4) of subsequent slant tracks (1), and an arrangement for generating the signal for this tracking tone recording part is described. Tracking tone signal generator (FIG. 4) is provided for generating a signal having a concatenation of a number of packets ($P_i$), each packet including a sync block (SB) having a first or a second disparity, and an identification block (ID) having a third or a fourth disparity. The disparities of the sync blocks and identification blocks in subsequent packets in a tracking tone recording part being chosen such that the running digital sum varies as a relatively low frequency waveform compared to the bit frequency of the signal in the tracking tone signal recording part. The first and the second disparities have an equal value but opposite sign. The third and the fourth disparities have an equal value but opposite sign. The identification blocks in subsequent packets include a first and a second count value (CV-0,CV-1), the second count value being the binary inverted value of the first count value, and the first count value relating to the sequence count number of the packets in the tracking tone recording part.

18 Claims, 5 Drawing Sheets

| | P0 | | P1 | | P2 | | P3 | |
|---|---|---|---|---|---|---|---|---|
| $T_1$ | SB-A | ID-B | SB-A | ID-B | SB-A | ID-B | SB-A | ID-B |

FIG.1A

| | P0 | | P1 | | P2 | | P3 | |
|---|---|---|---|---|---|---|---|---|
| $T_2$ | SB-A | ID-A | SB-B | ID-B | SB-A | ID-A | SB-B | ID-B |

FIG.1B

| | P0 | | P1 | | P2 | | P3 | |
|---|---|---|---|---|---|---|---|---|
| $T_3$ | SB-A | ID-A | SB-A | ID-B | SB-B | ID-B | SB-A | ID-A |

FIG.1C

ARRANGEMENT FOR RECORDING A VIDEO SIGNAL AND A CORRESPONDING AUDIO SIGNAL IN SLANT TRACKS ON A LONGITUDINAL MAGNETIC RECORD CARRIER, AND RECORD CARRIER OBTAINED BY MEANS OF THE ARRANGEMENT

BACKGROUND OF THE INVENTION

1. Field of the Invention

The invention relates to an arrangement for recording a video signal and a corresponding audio signal in slant tracks on a longitudinal magnetic record carrier, the tracks each being built up of a clock run-in part, a tracking tone recording part, and a audio- and video signal recording part, the arrangement comprising an input terminal for receiving the audio- and video signal, conversion means for convening the audio- and video signal into a format in which it can be recorded on the record carrier, clock run-in signal generating means, tracking tone signal generating means, signal combining means for combining the clock run-in signal, the tracking tone signal, and the converted audio- and video signal, so as to enable the recording of the said signals in the clock run-in part, the tracking tone recording part and the audio- and video signal recording part, respectively, of a track. Such an arrangement has been described in European patent application 92203342.8 (PHN 14.241) corresponding to U.S. application Ser. No. 127,223, filed Sep. 27, 1993. The invention also relates to a record carrier obtained by means of the arrangement.

2. Description of the Related Art

A tape format as described in this unpublished document enables the possibility of editing. To that purpose, the tracking tone recording part is needed, to position the head(s) on a track prior to overwriting the video- and/or audio information in said track. The tracking tone recording part is much shorter than the track length. In normal playback, the whole track length is used for deriving tracking information. During editing, only the tracking tone recording part are used to realize tracking. In present day recording arrangements, it occurs regularly that the tracking error during editing is too large.

SUMMARY OF THE INVENTION

The invention has for its object to provide an arrangement which includes the tracking tone signal generator means, which is adapted to generate such a tracking tone signal for recording in the tracking tone recording part in the tracks that it enables tracking for editing purposes, and enables a reference timing for an insert during editing.

To that purpose, the arrangement is characterized in that, the tracking tone signal generator means is adapted to generate a tracking tone signal for recording in the tracking tone recording part in one of the tracks, the tracking tone signal in the track comprising a concatenation of a number of packets, each packet including a sync block having a first or a second disparity and an identification block having a third or a fourth disparity, the disparity of the sync blocks and the identification blocks in the packets in the tracking tone recording pan being chosen such that the running digital sum of the tracking tone signal varies as a relatively low frequency waveform compared to the bit frequency of the signal in the tracking tone recording part, the first and the second disparities having an equal value but opposite polarity, the third and the fourth disparities having an equal value but opposite polarity, the identification blocks in the subsequent packets in the tracking tone recording part in each of the tracks each include a first and a second binary count value, the second binary count value being the binary inverted value of the first binary count value, the first binary count value relating to the sequence count number of the packets in a tracking tone recording part.

The invention is based on the recognition that, in order to realize a small tracking error during editing, the signal-to-noise ratio in the tracking tone recording pan should be higher, more specifically, more higher than in the remainder of the track. To that purpose, a fixed bit pattern and a count value are written in the tracking tone recording part. The count value is used for determining the position in the lengthwise direction of the track, and the fixed bit pattern is used for positioning the head on the track.

The fixed bit pattern contains the tracking tone information with a high signal-to-noise ratio and the count value should not disturb this high signal-to-noise ratio. Therefore, the count value is repeated with all bits inverted. Then the bit pattern of the count value and its inverted value is DC free and also at the tracking tone frequencies there is little energy.

BRIEF DESCRIPTION OF THE DRAWINGS

Further embodiments of the invention will be described in the drawings, in which FIG. 1 shows the format of the signals recorded in a track on the record carrier, and more specifically the format of the signal recorded in the tracking tone recording part (the ITI part), while FIGS. 1A–1C show corresponding consecutive packets in an ITI track part in respective neighboring tracks having sync and identification blocks of differing disparities;

DESCRIPTION OF THE PREFERRED EMBODIMENTS

Figure 1:
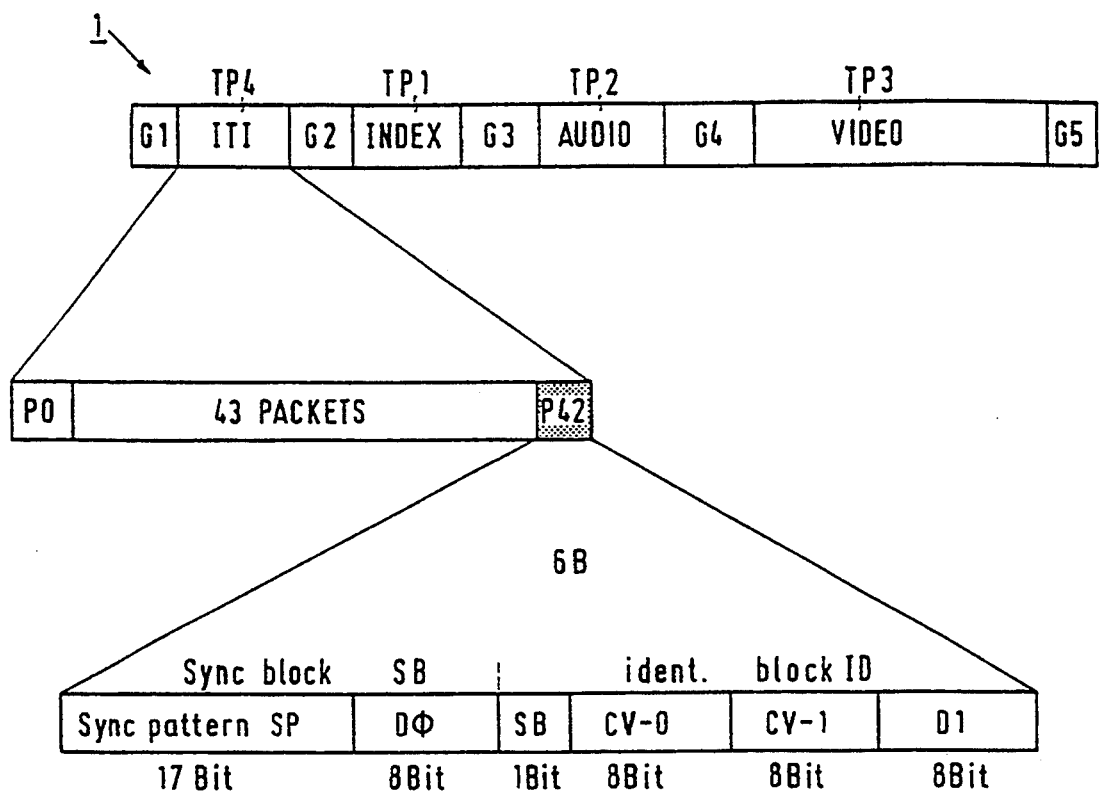

FIG. 1 shows the format of the signals as they are recorded in a track on a magnetic record carrier by means of a helical scan videorecorder. The left end of the track 1 in FIG. 1 is the start of the track and the right end of the track is the terminal part of the track. The track comprises a number of track parts. The track part denoted by G1 is the pre-amble track part, or clock run-in track part. It comprises as an example 47 25-bits pre-amble, or clock run-in, codewords. The clock run-in track part G1 has been described extensively in published European patent application 492,704 A1 (PHN 13,546), corresponding to U.S. Pat. No. 5,245,483. The application gives various possibilities for the bit patterns of the codewords to be used in the track part G1. As an example: a certain 25-bit long bit pattern and the inverse bit pattern of the bit pattern can be used as codewords, where the choice for the bit pattern or the inverse bit pattern is determined by the tracking tone that is to be embedded in the track part G1.

The track part G1 is followed by tracking tone recording part TP4, which is denoted by ITI (insert timing information) track part and which contains a tracking tone, synchronization information and identification (or timing) information. Further explanation of the contents of the ITI track part will be given later.

The track part TP4 is followed by an edit gap G2, which comprises, as an example, 37 25-bits codewords. The edit gap G2 is followed by the track part TP1, which is denoted by INDEX and which comprise, among others, subcode information, such as absolute and/or relative time information and a table of contents (TOC). This track part TP1 can comprise 45 25-bits words. The edit gap G3, which can comprise 52 25-bits codewords, is followed by a track part TP2 which comprises digital audio information included in 423 25-bits words. The edit gap G4 comprises, in the present example, 62 25-bits codewords, and is followed by a track part TP3 which comprises digital video information included in 4136 25-bits words. The track is terminated by the track part G5, which is the post-amble track part and comprises 47 25-bits codewords. The codewords used in the track part G5 can be the same codewords as the codewords used in the track part G1, where again the choice for a certain codeword or the inverse codeword depends on the tracking tone that is to be embedded in the track part G5.

The same explanation as regards the kind of codewords that is included in an edit gap is valid for the 37 25-bits codewords in the edit gap G2, the 52 codewords in the edit gap G3 and the 62 codewords in the edit gap G4.

The ITI track part TP4 comprises, in the present embodiment 43 packets P0, P1, ..., P42, of two 25-bits words each, resulting in 86 25-bits words in total. FIG. 1 discloses the contents of a packet, such as packet P42. The packet comprises a 25-bit sync block SB and a 25-bit identification block ID. The sync block SB comprises a 17-bit sync pattern SP and an 8-bit dummy word D0. The identification block ID comprises a single bit SB, an 8-bit first binary count value CV-0, an 8-bit second binary count value CV-1 and an 8-bit dummy word D1.

Depending on the tracking tone that is to be embedded in the digital data stream of the ITI track part, the following bit patterns for the various blocks are possible.

The sync block SB can have different bit patterns called 'SB-A' and 'SB-B'.

In the sync block called 'SB-A', the 17-bit sync pattern SP has the bit pattern, 0000 1111 1111 1100 1, which has a disparity of +5. The corresponding dummy word D0 equals the pattern 0001 1001 and has a disparity of −2, so that the disparity of 'SB-A' in this case equals +3. In the sync block called 'SB-B', the 17-bit sync pattern SP equals the bit pattern 1111 0000 0000 0011 0, which is the inverse of the sync pattern in 'SB-A', and consequently has a disparity of −5. The data pattern for the corresponding dummy word D0 is, in this case, 1110 0110, which is also the inverse of the previous data pattern for the dummy word. The disparity of this data pattern is +2, so that the disparity of 'SB-B' equals −3.

The 25-bit identification block can have two possible data patterns. In the first data pattern, called 'ID-A', the single bit SB equals '1' and the 8-bit dummy word D1 equals 0111 1100. The 8-bit count value CV-0 has as the first two bits a '00' pattern, and the next 6 bits indicate the sequence number of the packet in which the identification block is included. That means that the CV-0 word in the packet P0 equals 0000 0000, and that the CV-0 word in the packet P42 equals 0010 1010. For the CV-0 and CV-1 word in the same identification block the relation holds that the CV-1 word is the inverse of the CV-0 word. Consequently, the disparity of 'ID-A' is +3. The most significant bit of the count values are written first. This lowers the energy of the count values, so that the energy near the tracking frequencies as a result of the presence of the count values is minimum.

In the second data pattern for the 25-bit identification block, called 'ID-B', the SB bit is '0' and the 8-bit dummy word D1 equals 1000 0011. The 8-bit count value CV-0 has as the first two bits a '11' pattern, and the next 6 bits again indicate the sequence number of the packet in which the identification block is included. That means that the CV-0 word in the packet P0 equals 1100 0000, and that the CV-0 word in the packet P42 equals 1110 1010. The CV-1 word is again the inverse of the CV-0 word. Consequently, the disparity of the 'ID-B' is −3.

In order to embed a tracking frequency in the data stream of the ITI track part, a choice can be made between the 'SB-A' and the 'SB-B' patterns and between the 'ID-A' and the 'ID-B' patterns, when concatenating sync blocks and identification blocks so as to obtain the ITI track.

In a certain track $T_1$ as shown in FIG. 1A, the ITI track part could be obtained by concatenating blocks as follows: 'SB-A', 'ID-B', 'SB-A', 'ID-B', which sequence is repeated.

This means that subsequent disparities appear: +3, −3, +3, −3, +3, −3, ... This results in a tracking frequency $f_0$, which equals the frequency of the waveform of the running digital sum (or digital sum value) of all the disparities, having a certain value, as an example 360 kHz.

In a neighboring $T_2$ as shown in FIG. 1B, the ITI track part could be obtained by concatenating as follows:

'SB-A', 'ID-A', 'SB-B', 'ID-B', which sequence is repeated.

This means that subsequent disparities appear: +3, +3, −3, −3, +3, +3, ... This results in a tracking frequency $f_1$ to be equal to half the frequency $f_0$ given above. That is a value of 180 kHz, in the above given example.

In a next neighbouring track, the ITI track $T_1$ as shown in FIG. 1C, part could be obtained by concatenating as follows: 'SB-A', 'ID-A', 'SB-A', 'ID-B', 'SB-B', 'ID-B', which sequence is repeated. This means that subsequent disparities appear: +3, +3, +3, −3, −3, −3, ... This results in a tracking frequency $f_2$ to be equal to one third the frequency (of 360 kHz) given above. That is a value of 120 kHz, in the above given example.

The frequency values mentioned above are lower than the bit frequency in the serial datastream, which is 1/T, where T is the length in time of one bit in the serial datastream.

With these three frequencies, it is possible to realize a tracking system for positioning the head(s) relative to the track during reproduction. This tracking based on the embedded tracking tones formed by means of the low frequency varying running digital sum in the serial datastream, is well known and described in various publications in the prior art.

This tracking system is based on the detection of the crosstalk of the tracking tones recorded in the directly neighboring tracks.

It should be noted here that not all the three frequencies embedded in the tracks need to be used for tracking. Suppose, as an example, that in repeated cycles of 4 subsequent tracks, numbered $T_1$, $T_2$, $T_3$, $T_4$, the frequencies $f_0$, $f_1$, $f_0$, $F_2$, respectively, are embedded in the tracks. It suffices to use the frequencies $f_1$ and $f_2$ for tracking, namely by detecting the crosstalk of $f_1$ in track $T_2$ and of $f_2$ in the track preceding $T_1$ when following track $T_1$, and by detecting the crosstalk of $f_1$ in track $T_2$ and of $f_2$ in track $T_4$ when following track $T_3$.

Another example is that in repeated cycles of three subsequent tracks, numbered $T_1$, $T_2$, $T_3$, the frequencies $f_0$ and $f_1$ are embedded in the following way: $f_1$, $f_0$, $f_0$. In this case, it suffices to use the frequency $f_1$ only for tracking, namely by detecting the crosstalk from $f_1$ in track $T_1$, when following track $T_2$, and by detecting the crosstalk from $f_1$ in the track following track $T_3$, when following track $T_3$. The reason for generating the $f_0$ tracking frequency, although this frequency is not used for tracking, is to make sure that there is no frequency component at or near the frequency $f_1$(or $f_2$) or whatever other frequency (except $f_0$).

Another example of the packets in the ITI track part will now be described.

The previous tracking tone of 120 kHz can have the disadvantage that, especially in the case that the tracks have a relatively narrow width, the crosstalk of this 120 kHz tracking tone can be present over more than one neighboring track, so that it negatively influences the tracking in tracks lying further away from the track having the 120 kHz tracking tone. Increasing the frequency of the tracking tone towards a frequency between 180 kHz and 360 kHz would significantly improve this situation, as higher frequencies results in a smaller spread-out of the crosstalk.

It should be noted here, that the embedding of the tracking tones is also applied to the signals included in the audio blocks TP2 and video blocks TP3. This embedding of any tracking frequency in the data to be recorded, that is: not only the frequencies of 120, 180 and 360 kHz, but also frequencies in between those values, is realized very easily by means of the 24-to-25 bit modulator described in the previously mentioned EP 492,704 (U.S. Pat. No. 5,245,483). Contrary to this, as the bit pattern in the ITI track part is optimized for the frequencies of 120, 180 and 360 kHz, using a fixed bit pattern, the choice for a tracking frequency in between 180 and 360 kHz requires an adaptation of the fixed bit pattern in the ITI track part.

It should be further noted that the fixed bit patterns of the gaps G1, G2, G3, G4 and G5 require an adaptation as well. However, only the adaptation of the bit pattern of the ITI track part will be further described.

Figure 2:
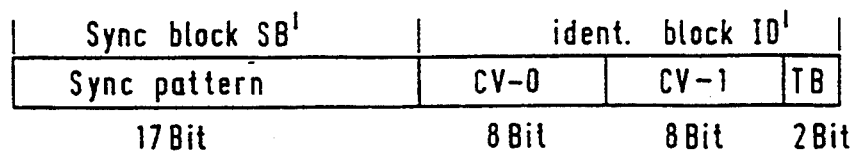
FIG. 2 another format of the signal recorded in the ITI track part.

In order to embed a tracking tone, having a frequency lying in the frequency region between 180 and 360 kHz, in the data stream of the ITI track part, the packets in the track part TP4 could comprise the sync block and the identification block shown in FIG. 2. The packets now comprise a sync block SB', which now only comprises the 17-bit sync pattern SP, and a 18-bit identification block ID', which now comprises the CV-0 word, the CV-1 word and a 2-bit word TB.

The packet in FIG. 2 which is denoted by $P_i$-A, i indicating the sequence number of the packet in the track part TP4, can have a sync pattern SP in the form of 0000 1111 1111 1100 1. The CV-0 and CV-1 words are again as described above and the 2-bit word TB has a pattern of '01'. This means that the packet $P_i$-A has a disparity of +5.

The packet in FIG. 2, can also be denoted by $P_i$-B. In that case, the sync pattern is in the form of 1111 0000 0000 0011 0, which is the inverse of the sync pattern in $P_i$-A. The CV-0 and CV-1 words are again as described above and the 2-bit word TB has a pattern of '10'. This means that the packet $P_i$-B has a disparity of −5.

In order to generate the data stream for the ITI track part of a track in which a tracking frequency lying in the frequency region between 180 kHz and 360 kHz should be embedded, the packets should be concatenated as follows: $P_1$−A, $P_2$−B, $P_3$−A, $P_4$−B, and so on.

This means that subsequent disparities appear: +5, −5, +5, −5, +5, −5, and so on.

A simple calculation makes clear that this tracking tone results in a tracking frequency of 360×25/35 kHz, which is 257 kHz. Further, a disparity of 5 over 35 bits results in roughly the same amplitude for the tracking tone signal as the disparity of 3 over 25 bits.

As the packets are now 35 bits long, compared to the 50 bits long packets in the other tracks, it will be necessary to record more packets in the ITI part of the track in question in order to have equal length ITI track parts in all the tracks. More specifically, the number of 35-bit packets should be 61, plus an additional 15 bits so as to come to a total number of 2150 bits, which is the same as 43×50 bits. This 15 bits can be exchanged with the track part G1 of that same track. As said earlier, this track part normally includes 47 25-bit codewords. In order to realize the 257 kHz tracking tone in the track part G1, it will be necessary to use other codewords, more specifically 35-bit codewords having a disparity of ±5. A track part G1 can be obtained by concatenating 34 35-bit codewords, which results in 1190 bits in the track part G1. A track part G1 of 47 25-bit codewords results in 1175 bits, which means that the 15 bits of the ITI track part can be exchanged with the G1 track part so as to make 34 35-bit codewords in the G1 track part possible. This means that the G1 track part in the track having the 257 kHz tracking tone is slightly longer than the G1 track part in the other tracks, and the ITI track part in the track having the 257 kHz tracking tone is slightly shorter than the ITI track parts in the other tracks.

As said earlier, the adaptation of the bit patterns of the gaps G2 to G5 to the tracking frequency of 257 kHz will not be explained. It will be evident that those track parts will now be filled with 35-bit packets having a disparity of +5. The length of the gaps G2 to G5 is not a multiple of packets of 35-bits. This means that care should be taken that the phase of the tracking tone signal is continuous over the boundaries of the gaps G2 to G5.

Figure 3:
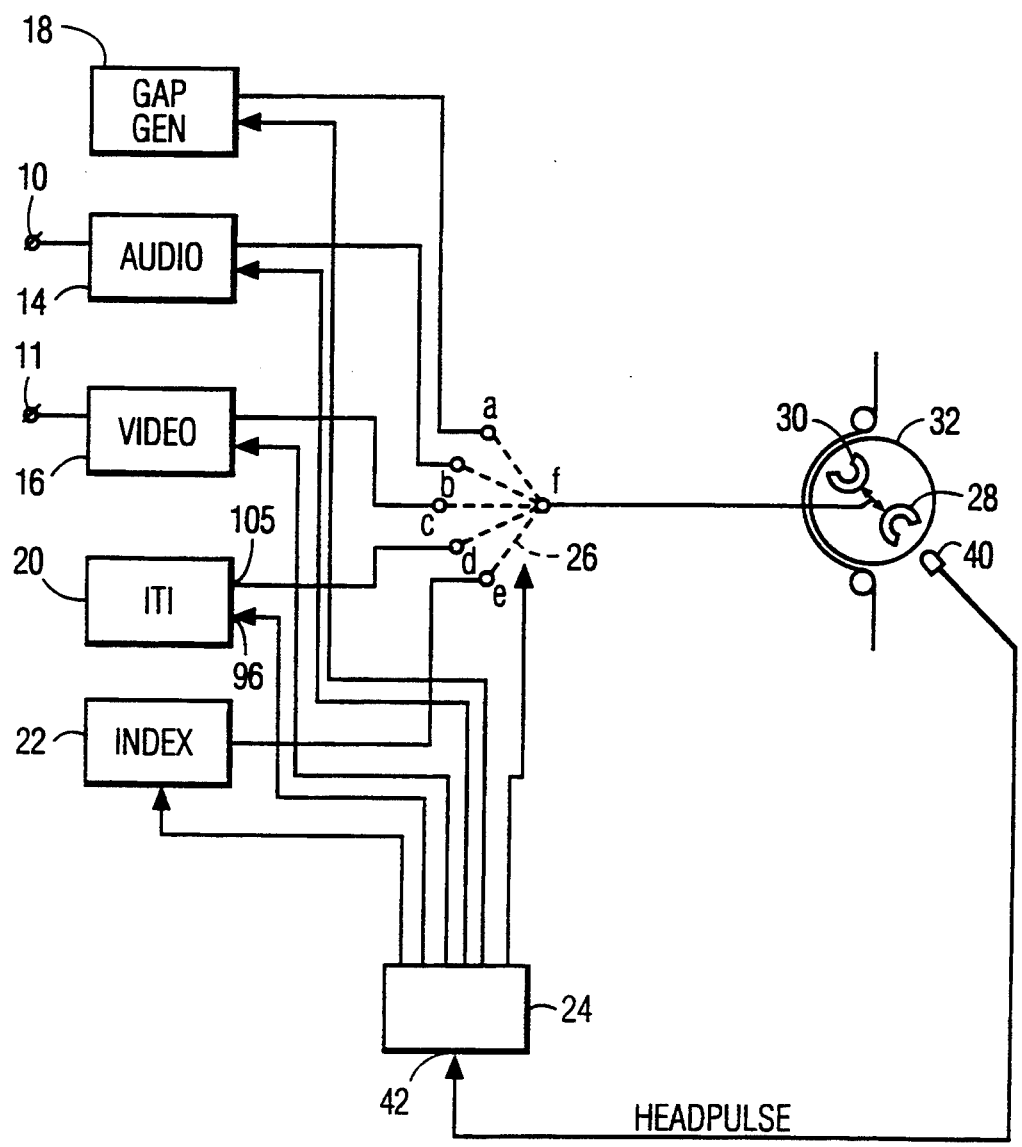
FIG. 3 an embodiment of the recording arrangement.

FIG. 3 schematically shows an embodiment of the arrangement. The arrangement comprises a first and a second input terminal 10 and 11, respectively, for receiving a digital audio signal and a digital video signal, respectively. The digital audio signal is converted in the conversion means 14 in a way as described in European patent application 492,704 A1. The digital video signal is converted in the conversion means 16 in a way as also described in European patent application 492,704 A1-(U.S. Pat No. 5,245,483). The order in which the blocks of audio- and video information are recorded in a track is however in the reverse order as described in the said patent application.

The arrangement comprises an edit-gap signal generator 18, a tracking tone signal (or ITI signal) generator 20, an index generator 22 and a central processing unit 24. Outputs of the generators 18, 20 and 22, and of the conversion means 14 and 16 are each coupled to a corresponding terminal of a multi-position switch 26, an output terminal (f) of which is coupled to write heads 28 and 30, accommodated on a rotatable head drum 32.

The central processing unit 24 is adapted to control and activate the generators 18, 20 and 22, the conversion means 14 and 16 and the switch 26. A control signal input 42 of the central processing unit 24 is coupled to an output of a detector 40, which is located at a stationary position near the circumference of the head drum 32, which detector 40 supplies pulses for each rotation of the head drum, the pulses being a measure for the time instants that the start point of a new track is written or is read.

At the start of the recording of a new track, like the track in FIG. 1, the central processing unit 24 generates a control signal for the edit gap generator 18, in response to a pulse applied to its input 42. Further, the unit 24 generates a control signal to the switch 26. Under the influence of this control signal, the switch positions itself in a position in which the terminals a and f are interconnected. The generator 18 generates the pre-amble or clock run-in codewords for recording in the G1 track part of the track. Next the unit 24 generates a control signal to the generator 20 and a control signal to the switch 26, such that it interconnects its terminals d and f. The generator 20 generates the sequence of packets, as described in FIGS. 1 or 2, for recording in the trackpart TP4. An embodiment of the generator 20 will be described later with reference to FIG. 4.

Now the central processing unit 24 generates a control signal to the edit-gap generator 18, and a control signal to the switch 26, which is again positioned in the position a-f. The generator 18 generates the edit gap signal described previously with reference to FIG. 1, for recording in the edit gap G2. Subsequently the processing unit 24 generates a control signal to the INDEX generator 22, and a control signal to the switch, which is now positioned in the position e-f. The generator 22 generates the signal for recording in the track part TP1 of the track in FIG. 1.

Next, the processing unit 24 supplies a control signal to the edit-gap generator 18 and the switch 26, so that the switch is again positioned into the position a-f. The generator 18 generates the edit gap signal described previously with reference to FIG. 1, for recording in the edit gap G3. This is followed by the generation of a control signal which is supplied to the audio conversion means 14, and a control signal to the switch 26, which is controlled into the position b-f. The audio information can now be recorded so as to obtain the track part TP2 of the track.

Next, the processing unit 24 supplies a control signal to the edit-gap generator 18 and the switch 26, so that the switch is again positioned into the position a-f. The generator 18 generates the edit gap signal described previously with reference to FIG. 1, for recording in the edit gap G4. This is followed by the generation of a control signal which is supplied to the video conversion means 16, and a control signal to the switch 26, which is controlled into the position c-f. The video information can now be recorded so as to obtain the track part TP3 of the track.

Finally, the processing unit 24 supplies a control signal to the edit-gap generator 18 and the switch 26, so that the switch is again positioned into the position a-f. The generator 18 generates the edit gap signal for recording as the post-amble track part G5.

Figure 4:
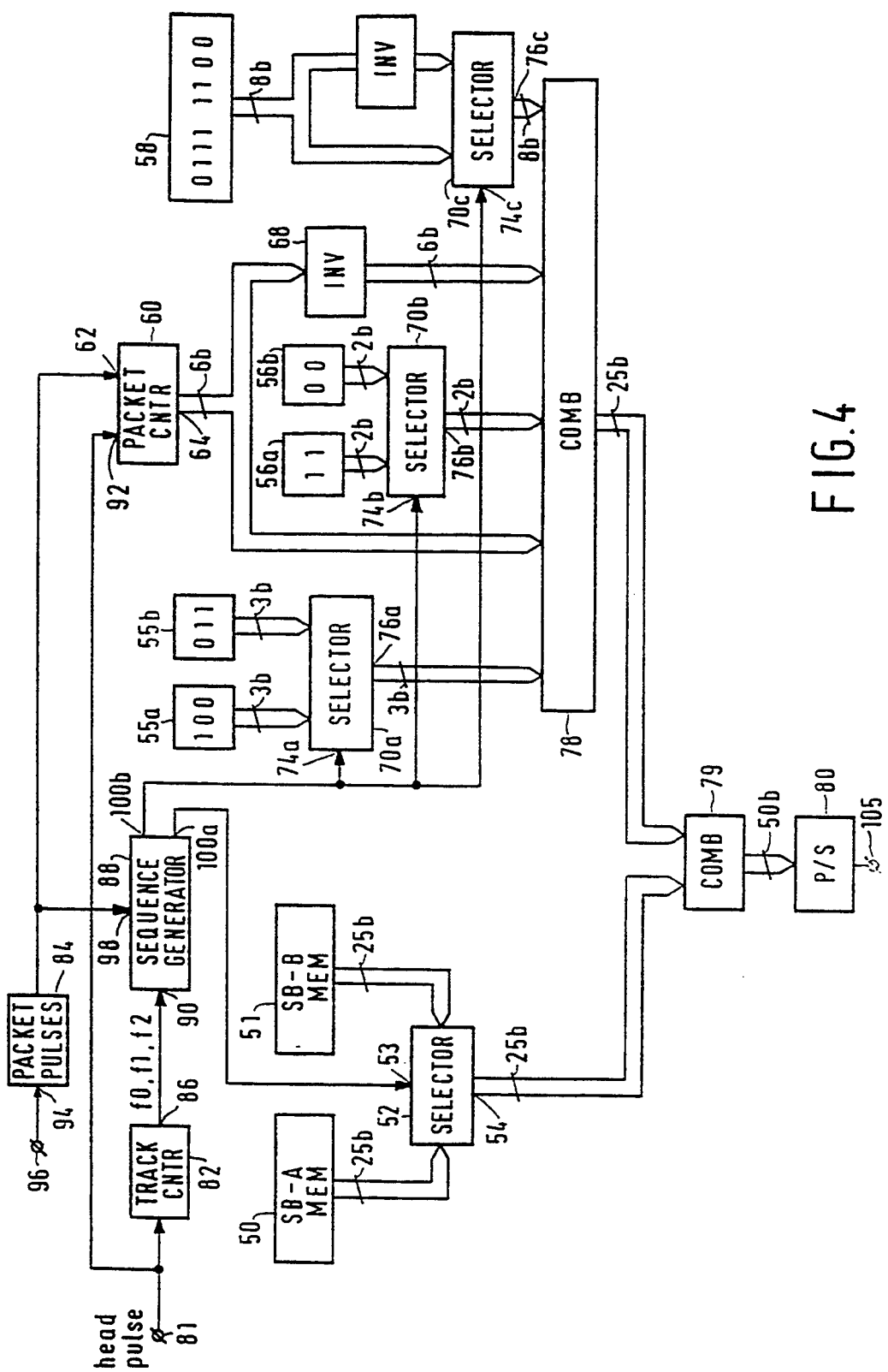
FIG. 4 an embodiment of the tracking tone generator.

Next, the functioning of the generator 20 will be further explained. FIG. 4 shows an embodiment of the generator 20 in more detail. The generator comprises a memory 50 in which the bit pattern of 'SB-A', described previously with reference to FIG. 1, is stored. 'SB-B' can be obtained by inverting all the bits of 'SB-A'. FIG. 4 however shows an additional memory 51 in which the bit pattern for 'SB-B' is stored. The 25-bit wide bit patterns of 'SB-A' and 'SB-B' are supplied to corresponding inputs of a selector 52. The selector 52 selects one of the two 25-bit sync blocks under the influence of a control signal applied to a control signal input 53, and supplies the selected 25-bit sync block to its output 54. The output 54 of the selector 52 is coupled to a first input of a combiner 79.

The generator further comprises memories 55a and 55b, which supply the 3-bit bitpatterns '100' and '011', respectively, memories 56a and 56b, which supply 2-bit bitpatterns '11' and '00', respectively, and a memory 58 which supplies the 8-bit dummy word D1. The two 3-bit data patterns supplied by the memories 55a and 55b are supplied to inputs of a selector 70a. The two 2-bit data patterns supplied by the memories 56a and 56b are supplied to inputs of a selector 70b. The 8-bit dummy word from the memory 58 and the inverted dummy word are supplied to inputs of a selector 70c. Under the influence of a control signal generated by the sequence generator 88, which control signal is applied to the control signal inputs 74a, 74b and 74c of the selectors 70a, 70b and 70c, respectively, the selectors select either the one or the other data patterns applied to their inputs and supply the selected data pattern to their outputs 76a, 76b and 76c, respectively. The outputs of the selectors 70a, 70b and 70c are coupled to a combiner 78. The generator is further provided with a packet counter 60, which cyclically counts from zero (decimal) to 42 under the influence of packet pulses applied to a clock input 62. At its output a 6-bit count value is present. This 6-bit count value is the 6-bit count value corresponding to the decimal count value of the counter 60. The 6-bit binary count value is applied to an inverter 66, which supplies a 6-bit inverted value at its output. The output of the block counter 60 as well as the output of the inverter 68 is also supplied to a combiner 78. The combiner combines the bit patterns supplied to its inputs. The combined outputs of the selectors 70a, 70b, 70c, the counter 60 and the inverter 66 form the 25-bit wide bit pattern of the identification block ID. With the selectors 70a, 70b and 70c selecting the data patterns supplied to their left hand inputs, the combiner 78 supplies the 25-bit identification block ID-A to its output. With the selectors 70a, 70b and 70c selecting the data patterns supplied to their right hand inputs, the combiner 78 supplies the 25-bit identification block ID-B to its output.

The combiner 78 supplies the 25-bit identification block to a second input of the combiner 79. The combiner 79 combines the two 25-bit blocks so as to generate the 50-bit data patterns for the packets $P_0$ to $P_{42}$, so that they can be recorded in the track part TP4 after having been subjected to a parallel-to-serial conversion in the converter 80.

The generation of the control signals for the selectors 52 and 70a, 70b and 70c, necessary for the selection of the sync blocks and the identification blocks, is realized in the following way. The generator further comprises an input 81 (which is not shown in FIG. 3) for receiving the head pulses generated by the detector 40. The head pulses are applied to inputs of a track counter 82 and the packet counter 60. The track counter 82 supplies a first, a second or a third control signal at its output, in response to the occurrence of a head pulse applied to its input. The first control signal relates to the tracking tone having the highest frequency, indicated by $f_0$. The second control signal relates to the next highest frequency, indicated by $f_1$. The third control signal relates to the lowest frequency, indicated by $f_2$. The control signals are applied to an input 90 of a sequence generator 88.

Under the influence of a head pulse applied to the input 92 of the packet counter 60, the count value of the packet counter is set to zero. Further, a packet pulse generator 84 is provided, having an input 94 coupled to the control signal input 96 of the generator 20. Under the influence of the control signal applied to the input 94, the packet pulse generator 84 generates 43 pulses, one pulse for each packet $P_i$ in the track part TP4, which pulses are applied to the input 62 of the packet counter 60, as well as to an input 98 of the sequence generator 88. Under the influence of the 43 pulses applied to the input 62, the packet counter 60 counts from zero to 42, and the corresponding binary values of the count values are applied to the output 64 so as to generate the 'ID-A' and the 'ID-B' for the packets $P_0$ to $P_{42}$.

Further, in response to the control signal applied to the input 90 and the pulses applied to the input 98, the sequence generator 88 supplies such control signals to the selectors 52 and 70a, 70b and 70c, that, when the first control signal (relating to $f_0$) is applied to the sequence generator 88, the following sync blocks and ID blocks are concatenated so as to form the ITI track part:

'SB-A', 'ID-B', 'SB-A', 'ID-B', which sequence is repeated.

In the next track, when the second control signal (relating to $f_1$) is applied to the sequence generator 88, the following sync blocks and ID blocks are concatenated so as to form the ITI track part:

'SB-A', 'ID-A', 'SB-B', 'ID-B', which sequence is repeated.

In the subsequent track, when the third control signal (relating to $f_2$) is applied to the sequence generator 88, the following sync blocks and ID blocks are concatenated so as to form the ITI track part: 'SB-A', 'ID-A', 'SB-A', 'ID-B', 'SB-B', 'ID-B', which sequence is repeated.

In again the next track, the track counter 82 generates again the first control signal (relating to $f_0$), so that the first mentioned concatenation is again generated. This continues, so that cyclically the tracking tone signals $f_0$, $f_1$ and $f_2$ are embedded in the ITI track part of each time three neighboring tracks.

Figure 5:
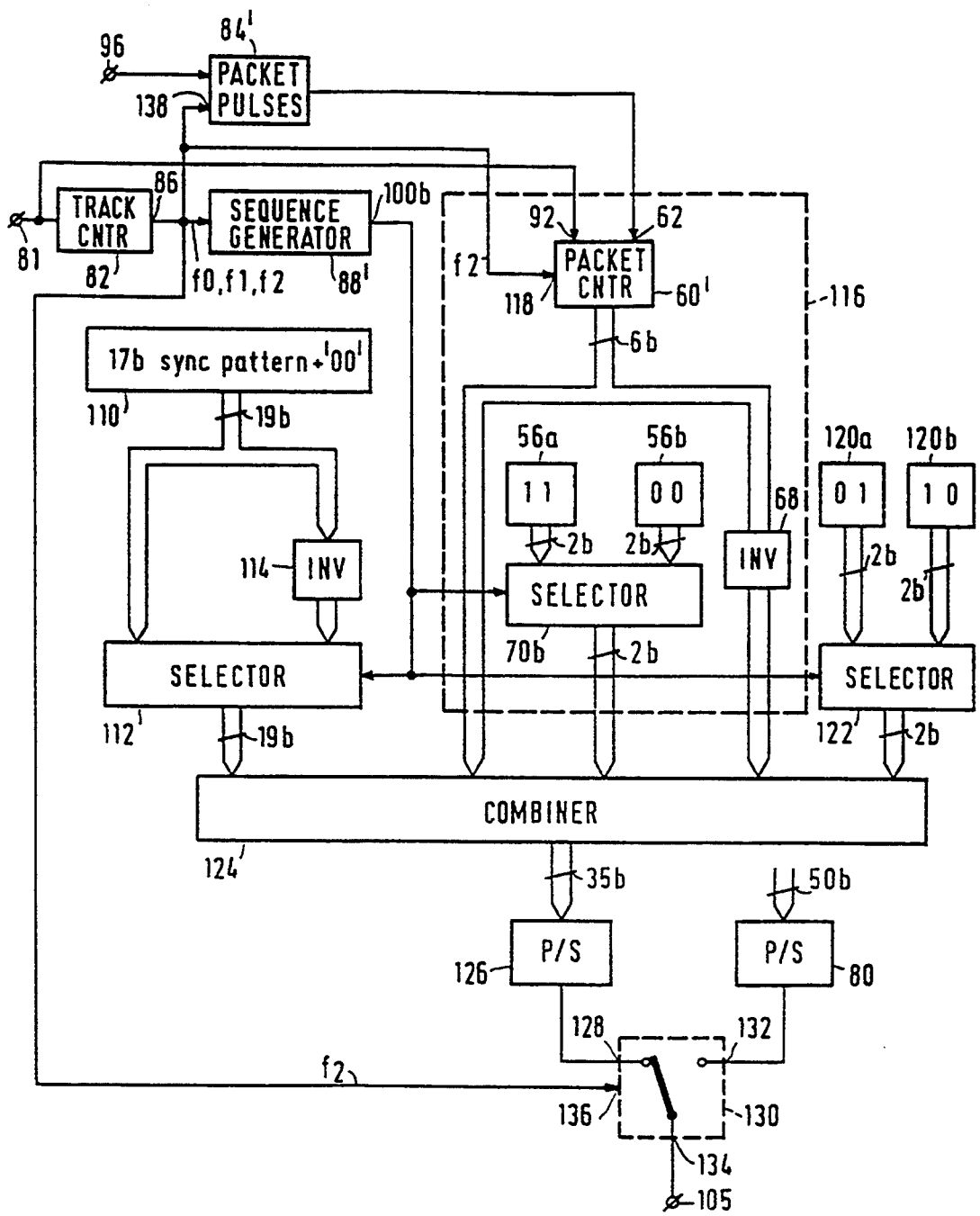
FIG. 5 part of another embodiment of the tracking tone generator; for generating one of the tracking tones.

FIG. 5 shows an embodiment in which the $f_2$ tone based on the concatenation of sync blocks and ID blocks as explained with reference to FIG. 2 can be generated. The generator disclosed in FIG. 5 includes a memory 110 in which the 17-bit sync pattern 0000 1111 1111 1100 1, followed by a 2-bit pattern '00' is stored. This 19-bit bitpattern is supplied to a first input of a selector 112 and, via an inverter 114, which inverts all the bits, to a second input of the selector 112. The functioning of the circuit part inside the broken lines indicated by reference numeral 116 is largely the same as in the corresponding circuit part in FIG. 4. The difference is that in FIG. 5, under the influence of the control signal $f_2$, which is supplied by the track counter 82 to the input 118 of the packet counter 60', this track counter 60' now counts from zero to 60, so as to generate the 61 35-bit packets $P_0$ to $P_{60}$. The circuit part 116 inside the broken lines can be in common for the two circuits of FIGS. 4 and 5.

The generator of FIG. 5 further comprises the memories 120a and 120b, for supplying the 2-bit word TB, which equals '01' and '10' for the packets $P_i$-A and $P_i$-B respectively. The outputs of the memories 120a and 120b are coupled to a selector 122. Outputs of the selectors 112, 70b and 122 and of the packet counter 60' and the inverter 68 are coupled to corresponding inputs of a combiner 124, which combines all the bits so as to obtain a 35-bit block for a packet $P_i$. The 35-bit wide output signal of the combiner 124 is supplied to a parallel-serial converter 126, whose output is coupled to a first input 128 of a switch 130. Also shown in, FIG. 5 is the parallel-serial converter 80 of the circuit diagram of FIG. 4, whose output is now coupled to a second input 132 of the switch 130. The output 134 of the switch is coupled to the output 105 of the generator 20. A control signal input 136 of the switch 130 is further coupled to the output 86 of the track counter 82. Under the influence of the occurrence of the $f_2$ control signal supplied by the track counter 82 to the switch 134, this switch connects the terminals 128 and 134 with each other, so that the 35-bit packets $P_i$ can be supplied to the output 105.

The output 86 of the track counter 82 is also coupled to a control signal input 138 of the packet pulse generator 84', which, under the influence of the control signal $f_2$, supplies a sequence of 61 pulses to the packet counter 60', so as to obtain the 61 packets for the track having the $f_2$ tracking tone embedded in it.

In the absence of the control signal $f_2$, the switch is positioned in the other position, and connects the terminals 132 and 134 with each other, so that the packets generated by the circuit part of FIG. 4 can be supplied to the output 105. Further, in the absence of the control signal $f_2$, the packet pulse generator 84' supplies only 43 packet pulses, as described previously in FIG. 4, so as to obtain the 43 packets in the other tracks.

It should be noted that the invention is not restricted to the use of sync blocks having either the first or the second disparity, such as $+3$ and $-3$, as in the previous example. If required the sync blocks can have more than two disparities. In the case of sync blocks having an even number of bits, it is possible to realize three disparities, such as $+2$, 0 and $-2$, as an example. In the case of sync blocks having an odd number of bits, it is possible to realize four disparities, such as $-3$, $-1$, 1 and 3 as an example.

It should further be noted that the invention is not restricted to the use of identification blocks having either the third or fourth disparity. If required, the identification blocks can have more than two disparities. The sync blocks and the identification blocks in the subsequent packets are chosen with such a disparity that the running digital sum of the tracking tone signal varies as the relatively low frequency waveform described previously.

It should further be noted that the first and second binary count value need not be accommodated serially after each other in the identification blocks. As has been said previously, the count value and its inverted value are, in combination, DC free and result in little energy at the tracking tone frequencies.

Assume the bits of the first binary count value CV-0 to be $b_0, b_1, \ldots b_7$, and the bits of the second binary count value $\bar{b}_0, \bar{b}_1, \ldots \bar{b}_7$. Then we can choose the bit sequence for a DC-free bit pattern in various ways such as: $b_0, \ldots b_7, \bar{b}_0, \ldots \bar{b}_7$ or $b_0 \ldots b_3, \bar{b}_0 \ldots \bar{b}_3, b_4 \ldots b_7, \bar{b}_4 \ldots \bar{b}_7$ or $b_0, b_1, \bar{b}_0, \bar{b}_1, b_2, b_3, \bar{b}_2, \bar{b}_3, \ldots$ or $b_0, \bar{b}_0, b_1, \bar{b}_1, b_2, \bar{b}_2, \ldots b_7, \bar{b}_7$.

I claim:

1. Arrangement for recording a video signal and a corresponding audio signal in slant tracks on a longitudinal magnetic record carrier, the tracks each being built up of a clock run-in part, a track tone recording part, and an audio/video signal recording part, the arrangement comprising:

an input terminal for receiving the audio and video signals;

conversion means for converting the audio and video signals into a format in which the converted audio and video signals can be recorded on the record carrier;

clock run-in signal generating means for generating a clock run-in signal;

tracking tone signal generating means for generating a tracking tone signal; and signal combining means for combining the clock run-in signal, the tracking tone signal, and the converted audio and video signals, so as to enable the recording of said signals in the clock run-in part, the tracking tone recording part and the audio/video signal recording part, respectively, of a track; characterized in that the tracking tone signal for recording in each track comprises a concatenation of a number of packets, each packet including a sync block having a first or a second disparity and an identification block having a third or a fourth disparity, the disparity of the sync blocks and the identification blocks in the packets in the tracking tone recording part being chosen such that a running digital sum of the tracking tone signal varies as a relatively low frequency waveform compared to a bit frequency of the signal in the tracking tone recording part, the first and the second disparities having equal values but opposite polarities, the third and the fourth disparities having equal values but opposite polarities, the identification blocks in the subsequent packets in the tracking tone recording part in each of the tracks each include a first and a second binary count value, the second binary count value being a binary inverted value of the first binary count value, the first binary count value relating to the sequence count number of a respective packet in a tracking tone recording part.

2. Arrangement as claimed in claim 1, characterized in that, the identification blocks in the subsequent packets in the tracking tone recording part of a track further comprise a fixed pattern, the fixed pattern in an identification block having a disparity which is equal to the disparity of said identification block.

3. Arrangement as claimed in claim 2, characterized in that the bits of the first binary count value and the second binary count value in an identification block are interleaved.

4. Arrangement as claimed in claim 2, characterized in that the sync blocks in the packets have the first, the second or at least one other disparity, said at least one other disparity having an absolute value which is different from that of said first or second disparity.

5. Arrangement as claimed in claim 1, characterized in that, the first disparity equals the third disparity.

6. Arrangement as claimed in claim 5, characterized in that the bits of the first binary count value and the second binary count value in an identification block are interleaved.

7. Arrangement as claimed in claim 5, characterized in that the sync blocks in the packets have the first, the second or at least one other disparity, said at least one other disparity having an absolute value which is different from that of said first or second disparity.

8. Arrangement as claimed in claim 1, characterized in that the third disparity equals zero.

9. Arrangement as claimed in claim 8, characterized in that the bits of the first binary count value and the second binary count value in an identification block are interleaved.

10. Arrangement as claimed in claim 8, characterized in that the sync blocks in the packets have the first, the second or at least one other disparity, said at least one other disparity having an absolute value which is different from that of said first and second disparity.

11. Arrangement as claimed in claim 1, characterized in that the bits of the first binary count value and the second binary count value in an identification block are interleaved.

12. Arrangement as claimed in claim 11, characterized in that the sync blocks in the packets have the first, the second or at least one other disparity, said at least one other disparity having an absolute value which is different from that of said first or second disparity.

13. Arrangement as claimed in claim 1, characterized in that the sync blocks in the packets have the first, the second or at least one other disparity, said at least one other disparity having an absolute value which is different from that of said first or second disparity.

14. Arrangement as claimed in claim 1, characterized in that the identification blocks in the packets have the third, the fourth or at least one other disparity, said at least one other disparity having a value which is different from that of said third or fourth disparity.

15. A longitudinal magnetic record carrier having slant tracks in which an audio signal and a corresponding video signal are recorded, the tracks each being built up of a clock run-in part, a track tone recording part, and an audio/video signal recording part, characterized in that the tracking tone signal in each track comprises a concatenation of a number of packets, each packet including a sync block having a first or a second disparity and an identification block having a third or a fourth disparity, the disparity of the sync blocks and the identification blocks in the packets in the tracking tone recording part being chosen such that a running digital sum of the tracking tone signal varies as a relatively low frequency waveform compared to a bit frequency of the signal in the tracking tone recording part, the first and the second disparities having equal values but opposite polarities, the third and the fourth disparities having equal values but opposite polarities, the identification blocks in the subsequent packets in the tracking tone recording part in each of the tracks each include a first and a second binary count value, the second binary count value being a binary inverted value of the first binary count value, the first binary count value relating to the sequence count number of a respective packet in a respective tracking tone recording part.

16. Arrangement as claimed in claim 3, characterized in that the sync blocks in the packets have the first, the second or at least one other disparity, said at least one other disparity having an absolute value which is different from that of said first or second disparity.

17. Arrangement as claimed in claim 6, characterized in that the sync blocks in the packets have the first, the second or at least one other disparity, said at least one other disparity having an absolute value which is different from that of said first or second disparity.

18. Arrangement as claimed in claim 9, characterized in that the sync blocks in the packets have the first, the second or at least one other disparity, said at least one other disparity having an absolute value which is different from that of said first or second disparity.

* * * * *